Sept. 15, 1959     O. S. KERSTNER ET AL     2,904,207
SHOCK ABSORBING STRUCTURE
Filed Nov. 27, 1956
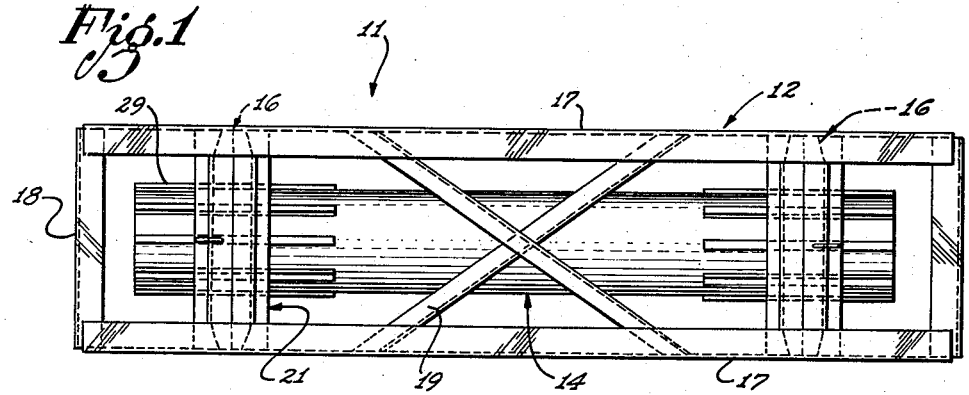
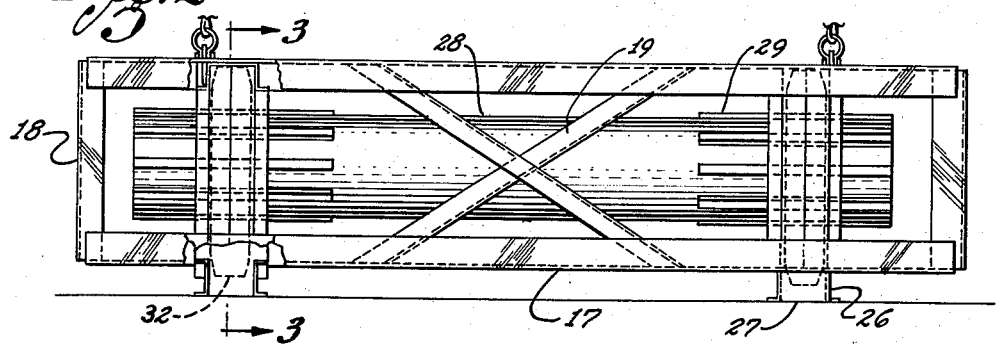
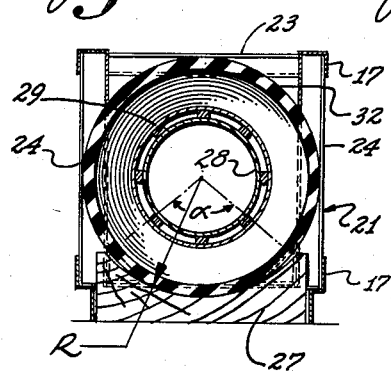 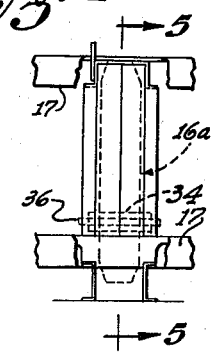 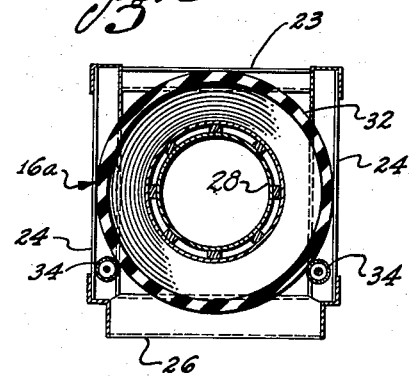
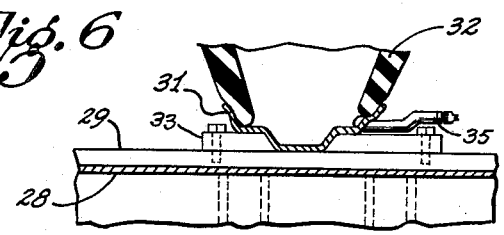
INVENTORS:-
Otto S. Kerstner
Leonard C. Oswald
Their Patent Attorney United States Patent Office 2,904,207
Patented Sept. 15, 1959

2,904,207
SHOCK ABSORBING STRUCTURE

Otto S. Kerstner, Culver City, and Leonard C. Oswald, Inglewood, Calif., assignors to Northrop Corporation, Hawthorne, Calif., a corporation of California Application November 27, 1956, Serial No. 624,557

4 Claims. (Cl. 217—53)

This invention relates to shock absorbing containers and more particularly to such containers utilizing conventional automobile tires as major component parts in the suspension thereof.

It is necessary to provide proper protection for a great many fragile and semi-fragile articles from impact shocks to which they may be subjected particularly during a shipping operation or the like. For example, missiles and many articles of similar nature must not be subjected to deceleration shock exceeding a predetermined maximum value, during shipping operations and storage periods thereof, if they are to remain operational. Damage in transit to a shipment of missiles or the like would be serious and might prove to be disastrous in a time of national emergency.

Briefly, the present invention discloses a structure including an inner cylindrical container spaced and suspended with respect to an outer container generally of rectangular configuration. The suspension means for the inner container includes a pair of pneumatic automobile tires which are mounted by novel means in a manner to effectively arrest and maintain impact shocks below predetermined maximum values.

Accordingly an object of the present invention is to provide an impact absorbing structure in which deceleration forces resulting from the dropping or similar mishandling of the structure are maintained below a predetermined maximum value.

Another object is to provide an impact absorbing structure having a suspension system utilizing conventional automobile tires to absorb vertical, lateral, and longitudinal impacts.

Another object is to provide an impact absorbing structure which is simple in design yet rugged in construction, which is economical to manufacture, and which is easily modified to receive articles of different configuration.

Although the characteristic features of the present invention are particularly pointed out in the appended claims, the invention itself, also the manner in which it may be carried out, will be better understood by referring to the following description taken in connection with the accompanying drawing forming a part of this application and in which:

Figures 1 and 2 are plan and side elevational views respectively of the impact absorbing structure as disclosed herein.

Figure 3 is a cross-sectional view of the structure shown in Figures 1 and 2 as viewed along the line 3—3 of Figure 2.

Figure 4 is a fragmentary side elevational view similar to Figure 2 but showing a different type of suspension means.

Figure 5 is a cross-sectional view of the structure shown in Figure 4 as viewed along the line 5—5 thereof.

Figure 6 is a fragmentary longitudinal cross-sectional view showing the manner in which the suspension means employed in the structures of Figures 1 and 4 is mounted.

Referring now to the drawings and particularly Figures 1 and 2 it will be seen that the principal components of the impact absorbing structure 11 consists of an outer assembly 12 and an inner container assembly 14. The inner container assembly 14 is suspended in spaced relation within the assembly 12 by means of a pair of pneumatic suspension assemblies 16.

In the embodiment shown the outer assembly 12 constitutes an open type structure which is fabricated on the most part from structural forms. The outer assembly includes longitudinally extending angular members 17, lateral members 18, brace member 19, and support assemblies 21 adapted to receive and provide proper support for the suspension assemblies 16, the members 17, 18, and 19 are assembled substantially as shown in Figures 1 and 2 to provide a box-like structure having open walls. Although it is apparent that the assembly 12 may have solid walls such construction would add materially to the gross weight of the structure 11 and very little to its protective ability.

Normally the support assemblies 21 are located equal distances on each side of the mid-point or C.G. of the outer assembly 12 but this relationship is not necessarily the case. Each of the assemblies 21 is of identical construction, therefore, the description of one will also apply to the other. Each of the assemblies 21 includes a flanged top member 23, angular side members 24, and a channel shaped base member 26 as best seen in Figures 2, 3, and 5. The support assemblies 21, with the exception of the base members 26, are mounted within and secured to the angular members 17. As assembled the top and side members 23 and 24 present opposing flanges which are spaced apart a predetermined distance and which extend inwardly of the members 17 to bear against the side walls of the pneumatic assembly 16 when the latter is inflated. Also in their assembled positions the members 23 and 24 present longitudinally extending flanges which abut each other to provide bearing surfaces for the outer periphery of the pneumatic assembly 16.

The base members 26 extend a suitable distance below the lowermost members 17 to provide support for the assembly 11 and to provide means whereby the assembly may be readily lifted by means of a fork truck or the like. Mounted between respective opposing channel members 26 is a support block 27. The inner surface of the block 27 is contoured to receive and contact the outer periphery of the pneumatic assembly 16 over a predetermined area and in the embodiment shown is in contact with the assembly 16 of approximately 90°. From the above it will be understood that the angle α may be less than, equal to, or greater than 90°, also that the radius R of the block 27 may be equal to or greater than the outside radius of the assembly 16. Therefore, although the angle α and radius R may vary considerably, the assembly 16 is in contact with the block 27 over a predetermined area for a particular installation and therefore provides a predetermined cushioning effect for the container 28 and components stored therein. In the embodiment shown the assembly 11, including the frame assemblies 21, is of welded construction, although it may be of bolted or riveted construction, The inner container assembly 14 includes a cylindrical container 28 which may be fabricated of steel, aluminum, or of a fiberglass-aluminum material. The container 28 is shorter in length than the outer assembly 12. Extending longitudinally on and circumferentially spaced around the outer periphery of the container 28 and adjacent each end thereof is a plurality of bar members 29 fixedly secured to the container 28 as by welding, riveting or the like. With the container 28 mounted in the outer assembly 12 the bar members 29 extend equal distances on each side of the assemblies 16.

Surrounding the container 28 and in contacting relation with the bar members 29 is a rim 31 on which a pneumatic tire 32 is mounted. The tire 32 constitutes a conventional automobile tire and as such carries a valve and valve stem combination 35, as shown in Figure 6, and provides means whereby the tire may be inflated and deflated. Longitudinal movement of the rim and tire is precluded by secondary bar members 33 which are bolted to the members 29 and which are provided with tapered ends which contact the rim as best seen in Figure 6.

The assembled relation of the container 28 and pneumatic assemblies 16 with the tire 32 inflated is characterized as follows. The lower peripheral portion of the tire 32 rests on the contoured block 27, the outer periphery portion of the tire contacts the longitudinally extending flanges of the members 23 and 24 in tangential relation at each side and at the top substantially as shown in Figure 3. Also the opposed inwardly extending flanges of the members 23 and 24 contact the side walls of the tire 32 to effectively resist longitudinal impacts to which the structure 11 may be subjected.

The modification of the pneumatic suspension assembly identified as 16a in Figures 4 and 5 is constructed similarly as the suspension assembly 16 of Figures 1, 2, and 3. However, in the embodiment shown in Figures 4 and 5 the supporting block 27 is omitted and is replaced by a pair of pivoted rollers 34. The rollers 34 are mounted on pins 36 which have their ends bearing in the side flanges of the members 24 at the lower end portions thereof. The location of the rollers is further characterized in that as they support the tire 32 with its lowermost outer periphery spaced from the surface on which the channel members 26 rest. As positioned the rollers 34 not only provide support for the assembly 16a but also they allow the tire 32 to function as a cushioning or impact absorbing device as explained below.

The rollers 34 are spaced apart laterally a distance slightly less than the outer diameter of the tire 32. Upon downward vertical deceleration of the structure 11 the tire will be compressed at its contact points with the roller 34 and a portion of the impact will be absorbed by the compression of the tire. Also as the assembly 16a moves in a downwardly direction another shock absorbing feature occurs. As the tire 32 is compressed adjacent the rollers 34 the tire rolls slightly thereon allowing the assemblies 16a, also the container 28 and components mounted therein, to move through a greater distance in absorbing a shock of given magnitudes than would be possible with conventional suspension means.

A missile or other semi-fragile article is carried within the container 28 and is secured therein by fixtures (not shown). A missile mounted in the container 28, which in turn is suspended in the manner shown in Figures 4 and 5, will not normally be subjected to shock forces exceeding certain predetermined allowable maximum G forces although the outer assembly may be subjected to or even greater shock forces.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A shock absorbing structure comprising: an outer container assembly having top, bottom and side walls; a pair of support assemblies fixedly secured in said outer assembly in spaced relation with respect to each other; each of said support assemblies includes a plurality of rigid opposed flanges which extend inwardly from the top and side walls of said outer assembly; individual support means which include a pair of rollers mounted for rotation adjacent said bottom wall and between the respective opposed flanges of each of said support assemblies; a pair of shock absorbing assemblies each including a pneumatic tire mounted on a respective rim; said shock absorbing assemblies are mounted in said outer assembly at positions between the respective opposed flanges of each of said support assemblies with a portion of the outer periphery of said tire in contact with said pair of rollers; an inner container assembly mounted within said rims and fixedly secured thereto; and valve stem means associated with each of said tires whereby said tires may be inflated or deflated as desired.

2. A shock absorbing structure as set forth in claim 1: further characterized in that said pair of rollers are mounted for rotation in the respective lower ends of said opposed flanges which extend inwardly from the side walls of said outer assembly and the distance between the axes of a respective pair of rollers is substantially equal to but less than the diameter of one of said tires.

3. A shock absorbing structure comprising: an outer elongated container assembly having top, bottom and side walls; a pair of support assemblies fixedly secured in said outer assembly in spaced relation with respect to each other; each of said support assemblies includes a plurality of rigid opposed flanges which extend normal to and inwardly from the top and side walls of said outer assembly; individual support means which include a pair of rollers mounted for rotation adjacent said bottom wall and between the respective opposed flanges of each of said support assemblies; a pair of shock absorbing assemblies each of which includes a pneumatic tire mounted on a respective rim; said shock absorbing assemblies are mounted in said outer assembly at positions between the respective opposed flanges of each of said support assemblies with a portion of the outer periphery of said tire in contact with said pair of rollers; an inner container assembly mounted within said rims and fixedly secured thereto; and each rim and tire combination includes valve stem means whereby said tire may be inflated or deflated as desired.

4. A shock absorbing structure as set forth in claim 3: further characterized in that said pair of rollers are mounted for rotation in the respective lower ends of said opposed flanges which extend inwardly from the side walls of said outer assembly and the distance between the axes of a respective pair of rollers is substantially equal to but less than the outside diameter of one of said tires.

References Cited in the file of this patent

UNITED STATES PATENTS

| 1,457,496 | Butler | June 5, 1923 |
| 2,700,458 | Brown | Jan. 25, 1955 |
| 2,774,503 | Moore | Dec. 18, 1956 |

FOREIGN PATENTS

| 137,831 | Austria | June 11, 1934 |
| 262,275 | Great Britain | Dec. 9, 1926 |